United States Patent [19]

Simmons et al.

[11] Patent Number: 5,292,137
[45] Date of Patent: Mar. 8, 1994

[54] ROTARY SHAFT SEALING METHOD AND DEVICE

[75] Inventors: Brian Simmons, San Ramon; Leonid G. Zeltser, Pleasanton; Arnold Kholodenko, San Francisco, all of Calif.

[73] Assignee: Rotoflex, Inc., Pleasanton, Calif.

[21] Appl. No.: 996,520

[22] Filed: Dec. 23, 1992

Related U.S. Application Data

[63] Continuation of Ser. No. 868,080, Apr. 13, 1992, abandoned, which is a continuation-in-part of Ser. No. 735,920, Jul. 25, 1991, and Ser. No. 738,007, Jul. 30, 1991, abandoned, which is a continuation-in-part of Ser. No. 595,420, Oct. 11, 1990, abandoned.

[51] Int. Cl.$^5$ ............................................. F16J 15/34
[52] U.S. Cl. ................................................ 277/1; 277/4; 277/9; 277/64; 277/65; 277/85; 277/95; 277/96.1; 277/96.2; 277/115
[58] Field of Search .................. 277/1, 4, 9, 38–43, 277/64, 65, 81 R, 85–87, 95, 96, 96.1, 96.2, 115

[56] References Cited

U.S. PATENT DOCUMENTS 706,290  8/1902  Zwart .
1,470,587 10/1923 Somes .

(List continued on next page.)

FOREIGN PATENT DOCUMENTS

| 671238 | 9/1963 | Canada . |
| 133073 | 6/1984 | European Pat. Off. . |
| 58-118375 | 7/1983 | Japan . |
| 58-118377 | 7/1983 | Japan . |
| WO88/04379 | 6/1988 | PCT Int'l Appl. . |
| 1195100 | 9/1984 | U.S.S.R. . |
| 28433 | of 1903 | United Kingdom . |
| 8470 | of 1914 | United Kingdom . |

OTHER PUBLICATIONS

CR Seals Handbook, Catalog #457010, Jan. 1986; pp. 3, 4, 10 & 25.

(List continued on next page.)

Primary Examiner—William A. Cuchlinski, Jr.
Assistant Examiner—Scott W. Cummings
Attorney, Agent, or Firm—Oblon, Spivak, McClelland, Maier & Neustadt

[57] ABSTRACT

A dry-face sealing method for preventing leakage around a rotary shaft uses an annular rigid seal having a smooth sealing surface and an annular resilient seal having a projecting sealing edge aligned coaxially therewith. The annular resilient seal has a breaking elongation of at least about 100 percent of its original length, the resilient seal being stretched at least about 20 percent and less than 40 percent of its breaking elongation in a direction substantially parallel to the smooth sealing surface to align polymeric resilient seal components in a direction parallel with the smooth sealing surface and smooth the sealing surface thereof. The projecting edge, because of its shape and position, functions as a stress concentrator, concentrating the stress hardening effect on the sealing surface of the projecting edge. The method comprises pressing the projecting edge in an axial direction against the smooth sealing surface with a pressure which is sufficient to effect a seal therebetween under operating conditions of the seal but which will not produce sufficient heat of friction to cause significant chemical changes in the projecting edge of the resilient seal. The result is an effective rotary sealing which does not require a liquid for lubrication or radial emission suppression. The smooth sealing surface of the device can be adjusted to change the sealing pressure to accommodate operating conditions, using a moveable, threaded housing made of a material having a high thermal conductivity. This primary seal can be used alone or in combination with a backup dry face stuffing box seal.

20 Claims, 6 Drawing Sheets

U.S. PATENT DOCUMENTS

| | | |
|---|---|---|
| 2,077,954 | 4/1937 | Ramclow . |
| 2,863,680 | 12/1958 | Taltavall, Jr. . |
| 3,015,505 | 1/1962 | Smith et al. . |
| 3,072,414 | 1/1963 | Porges et al. . |
| 3,112,113 | 11/1963 | Taylor . |
| 3,223,425 | 12/1965 | Leman . |
| 3,615,097 | 10/1971 | Malmstrom . |
| 3,655,205 | 4/1972 | Petersen . |
| 3,655,206 | 4/1972 | Adams . |
| 3,705,728 | 12/1972 | Millar . |
| 3,807,742 | 4/1974 | Hershey . |
| 4,099,765 | 7/1978 | Bright ............ 49/490 X |
| 4,136,887 | 1/1979 | Wentworth, Jr. . |
| 4,230,324 | 10/1980 | Derman . |
| 4,295,654 | 10/1981 | Kawamura et al. . |
| 4,311,315 | 1/1982 | Kronenberg . |
| 4,364,571 | 12/1982 | Hershey . |
| 4,413,830 | 11/1983 | Pietsch . |
| 4,463,439 | 2/1987 | Lewis et al. . |
| 4,465,285 | 8/1984 | Toyoda et al. . |
| 4,538,820 | 9/1985 | Duffee . |
| 4,580,790 | 4/1986 | Doose ............ 277/96.2 X |
| 4,691,927 | 9/1987 | Sudol et al. . |
| 4,819,999 | 4/1989 | Livesay et al. ......... 277/96.2 X |
| 4,872,689 | 10/1989 | Drumm . |
| 4,962,136 | 10/1990 | Peters ............ 523/220 |
| 4,973,063 | 11/1990 | Korenblit . |
| 4,989,882 | 2/1991 | Warner et al. . |
| 4,989,883 | 2/1991 | Orlowski . |
| 4,991,857 | 2/1991 | Pippert . |
| 4,995,620 | 2/1991 | Zawaski et al. . |
| 4,997,191 | 3/1991 | Warner . |
| 4,997,192 | 3/1991 | Nagai et al. . |
| 5,049,347 | 9/1991 | Magill et al. ............ 264/280 |

OTHER PUBLICATIONS

Mechanical Face Seal Handbook: John C. Dahlheimer; Chilton Book Company, Aug. 26, 1975; pp. 76–77.

Mechanical Seals; 2nd Edition; E. Mayer; American Elsevier Publishing Co., Inc. Aug. 1975; pp. 10 & 11.

Mechanical Seal Designs & Types: Date Unknown; Fluid Sealing Association, pp. 8–10.

Recent Developments Expand Aflas Elastomer Performance: Date Unknown; Dennis Hull, Xenox, Inc., Houston, Tex.; 6 pages.

Polymer Engineering and Science; vol. 27, No. 15 Effects of Strain-Induced Crystallization on the Elastic and Thermoelastic Properties of Some Fluorelastomers: Y.-H. Hsu; Dept. of Chemistry & Polymer Research; Aug. 1987; pp. 1203–1208.

"Strain Effects Upon . . . ", Stevens, C. A. NTIS No. P888-170054; Nov. 1988; Research Report: (Abstract Ordered on Mar. 25, 1992).

ROTARY SHAFT SEALING METHOD AND DEVICE

RELATIONSHIP TO COPENDING APPLICATIONS

This application is a continuation of application Ser. No. 07/868,808, filed on Apr. 13, 1992, now abandoned, which is a continuation-in-part of copending applications Ser. No. 07/735,920 filed July 25, 1991, and Ser. No. 07/738,007 filed July 30, 1991, now abandoned, both of which, in turn, are continuations-in-part of application Ser. No. 07/595,420 filed Oct. 11, 1990, now abandoned. The entire contents of all of the above applications are hereby incorporated by reference.

FIELD OF THE INVENTION

This invention relates to sealing devices for rotating shafts and more particularly to seals located between a rotating shaft and a housing of a pump, pressure vessel or the like in which fluid is contained under pressure. Such fluids may includes liquids, gases, or slurries such as those containing corrosive chemicals.

BACKGROUND OF THE INVENTION

In industries with manufacturing processes involving fluids, numerous pumps and other rotary shaft devices are required for the transport and handling of fluids such as slurries and chemical solutions. The flushing water requirements of these seals for seal lubrication and radial emission suppression greatly increased operational water requirements and increased the volumes of liquid wastes requiring treatment to remove environmental pollutants.

Our dry-face rotary seals were developed to solve these problems. These seals rely on unlubricated dry contact between a resilient seal member and a hard smooth surface of an opposed sealing member, the pressure at the contact surface between these two members being sufficient to prevent passage of liquid therebetween. The normally high friction between such elastomeric materials and hard surfaces would appear to so severely limit the useful life of such seals that they would not be practical. One would expect that liquid lubricants would be required to reduce this friction.

However, we have found that if the contact area of the resilient member is minimized, the resilient materials at the contact area are stress hardened, the polymeric components aligned in a direction parallel to the hard sealing surface, and heat transfer elements are provide to remove heat from the sealing contact surfaces, the life of such seals are greatly extended and satisfy industrial requirements, without liquid lubrication. Since these dry-face seals do not require flushing water either for lubrication or for radical emission suppression, they are revolutionizing the field of rotary seals.

OBJECTS AND SUMMARY OF THE INVENTION

It is an object of this invention to provide a dry face seal with a long operational life without requiring liquid lubrication during operation, and which can be used with rotary pumps and other devices operating with all types of liquids and suspensions.

It is a principal object of this invention to provide a sealing method and apparatus using a resilient sealing member with a minimized sealing contact area and with sufficient heat transfer to maintain the temperature at the sealing surface below destructive levels, the contact surface being a stress hardened material.

It is another object of this invention to provide a dry face seal which reduces the volume of water used in manufacturing facilities and released therefrom into the environment, and which can be used with liquids containing or producing gaseous components without releasing hazardous amounts of the gaseous components into the environment.

It is a particular object of this invention to provide an optimum dry seal by providing a moveable housing for the rigid seal in order to adjust its position relative to the resilient seal and to adjust the sealing pressure at the sealing contact area therebetween.

It is a another particular object of this invention to provide in the moveable housing, an effective heat transfer conduit for transporting heat from the primary seal contact area and minimizing the temperature at the sealing surface.

It is a yet further object of this invention to provide a primary dry face seal combined with a backup stuffing box seal which can be brought into action in the event of a primary seal failure.

Primary Seal

The method of this invention prevents leakage around a rotary shaft extending through a structural casing using an annular rigid seal having a smooth sealing surface and an annular resilient seal having a projecting sealing edge aligned coaxially therewith. The annular resilient seal has a breaking elongation of at least about 100 percent of its original length, the resilient seal being stretched at least about 20 percent and less than 40 percent of its breaking elongation in a direction substantially parallel to the smooth sealing surface to align polymeric resilient seal components in a direction parallel with the smooth sealing surface and smooth the sealing surface thereof. Stretching the resilient seal modifies the mechanical characteristics and properties of the projecting edge. The projecting edge, because of its shape and position, functions as a stress concentrator, concentrating the stress hardening effect on the sealing surface of the projecting edge. The method comprises pressing the projecting edge in an axial direction against the smooth sealing surface with a pressure which is sufficient to effect a seal therebetween under operating conditions of the seal but which will not produce sufficient heat of friction to cause significant chemical changes in the projecting edge of the resilient seal.

In summary, an embodiment of a device using this method is a dry face rotary seal for preventing leakage around a rotary shaft comprising an annular rigid seal having a smooth sealing surface means for establishing a dry face seal and an annular resilient seal having an annular projecting edge means for contacting the smooth sealing surface under a biased pressure to form a dry face seal in conjunction therewith. One of the rigid seal and the resilient seal, preferably the resilient seal, is adapted for attachment to a rotary shaft and the other of the rigid seal and the resilient seal, preferably the rigid seal, is adapted to be secured to a structural casing surrounding the rotary shaft. The resilient seal preferably has a breaking elongation of at least about 100 percent of its original length, the resilient seal being stretched at least about 20 percent to less than 40 percent of its breaking elongation in a direction substantially parallel to the smooth sealing surface. This provides a strain hardening of the resilient seal, aligns polymeric resilient seal components in a direction parallel with the smooth sealing surface, and smooths the sealing surface thereof. Preferably, the projecting edge of the resilient seal is pressed in an axial direction against the smooth sealing surface with a pressure which is sufficient to effect a seal therebetween under operating conditions of the seal but which will not produce sufficient heat of friction to cause significant chemical changes in the projecting edge of the resilient seal. Optimally, the width of the projecting edge in contact with the smooth sealing surface in the radial direction is less than about 2 mm, the resilient seal has a durometer hardness of from about 85 to about 95, and the resilient seal comprises a thermally resistant fluorocarbon polymer. One preferred embodiment comprises seal pressure adjustment means for adjustably setting or controlling the pressure of the projecting edge against the smooth sealing surface during relative rotary motion of the resilient and rigid seal to accommodate or adjust to the operating conditions. This can comprise a collar and rigid seal housing concentric therewith, the rigid seal housing in supporting engagement with the rigid seal, and the collar being adapted to be secured to the structural casing surrounding the rotary shaft and in threaded engagement with a the rigid seal housing. Optimally, the rigid seal is mounted in an rigid seal housing having high thermal conductivity.

Optional Backup Seal

Another aspect or embodiment of the invention is a dry face stuffing box rotary seal for preventing leakage around a rotary shaft comprising a frustoconical gland packing receptor adapted to surround a rotary sealing surface axially concentric therewith, the packing receptor having a distal end and a proximal end, the distal end having a packing abutment surface, a sloped surface extending radially outward from the abutment surface toward the proximal end, an annular, plastic sacrificial packing positioned in the distal end, the sacrificial packing having a proximal surface, and an annular, slightly deformable primary packing positioned between the proximal surface of the sacrificial packing and the proximal end of the gland packing receptor. Preferably, the sacrificial packing and the primary packing are frustoconical, annular packing rings that are initially unseated and spaced from a rotary sealing surface which is axially concentric therewith. Optimally, the sacrificial packing is a preshaped frustoconical ring containing graphite and a thermally stable fluorocarbon polymer, and the primary packing is a preshaped, slightly deformable composition comprising graphite and a plastic binder. The frustoconical gland surface can form an angle of from 10° to 30° with a line parallel to the central axis of the gland. The gland seal can have a cylindrical surface at the proximal end of the gland adapted to receive a concentric, annular gland follower. Optimally, the dry face stuffing box seal is combined as an unseated backup seal with the primary dry face rotary seal.

The method of this invention for preventing leakage around a rotary shaft extending through a structural casing with a dry face stuffing box seal comprises positioning a frustoconical gland packing receptor around a rotary sealing surface axially concentric therewith, the packing receptor having a distal end and a proximal end, the distal end having a packing abutment surface, a sloped surface extending radially outward from the packing abutment surface toward the proximal end. An annular, plastic sacrificial packing is positioned in the distal end, the sacrificial packing having a proximal surface. An annular, slightly deformable primary packing is positioned between the proximal surface of the sacrificial packing and the proximal end of the gland packing receptor. The primary packing is compressed tightly against the sacrificial packing until the inner surface of the primary packing forms a seal with the rotary sealing surface.

DETAILED DESCRIPTION OF THE INVENTION

The devices of this invention are suitable for use with rotary shaft devices used in process and mining industries. For purposes of example and not by way of limitation, the invention is described hereinafter using an embodiment which is particularly adapted for use with slurry pumps. The same basic configurations can be used for other pumps used in chemical manufacturing, and other industries requiring pumping of suspensions and chemical process solutions.

The term "breaking elongation", as used herein, is defined as the percentage of stretch under tension of an elastomer from its relaxed condition to its breaking point.

The method of this invention prevents leakage around a rotary shaft extending through a structural casing using an annular rigid seal having a smooth sealing surface and an annular resilient seal having a projecting sealing edge aligned coaxially therewith.

The annular resilient seal has a breaking elongation of at least about 100 percent of its original length. The resilient seal is stretched from about 20 up to about 40 percent of its breaking elongation in a direction substantially parallel to the smooth sealing surface. This stretching aligns polymeric resilient seal components in a direction parallel with the smooth sealing surface and smooth the sealing surface thereof. Stretching the resilient seal also modifies the mechanical characteristics and properties of the projecting edge. The projecting edge, because of its shape and position, functions as a stress concentrator, concentrating the stress hardening effect on the sealing surface of the projecting edge. The method comprises pressing the projecting edge in an axial direction against the smooth sealing surface with a pressure which is sufficient to effect a seal therebetween under operating conditions of the seal but which will not produce sufficient heat of friction to cause significant chemical changes in the projecting edge of the resilient seal.

These critical features yield a dry face seal with a surprisingly long useful life. The stress hardening of the contact surface, alignment of the polymers and smoothing of the contact surface of the resilient element reduce the coefficient of friction and provide an effective seal with a minimum contact area even at high operating pressures.

Figure 1:
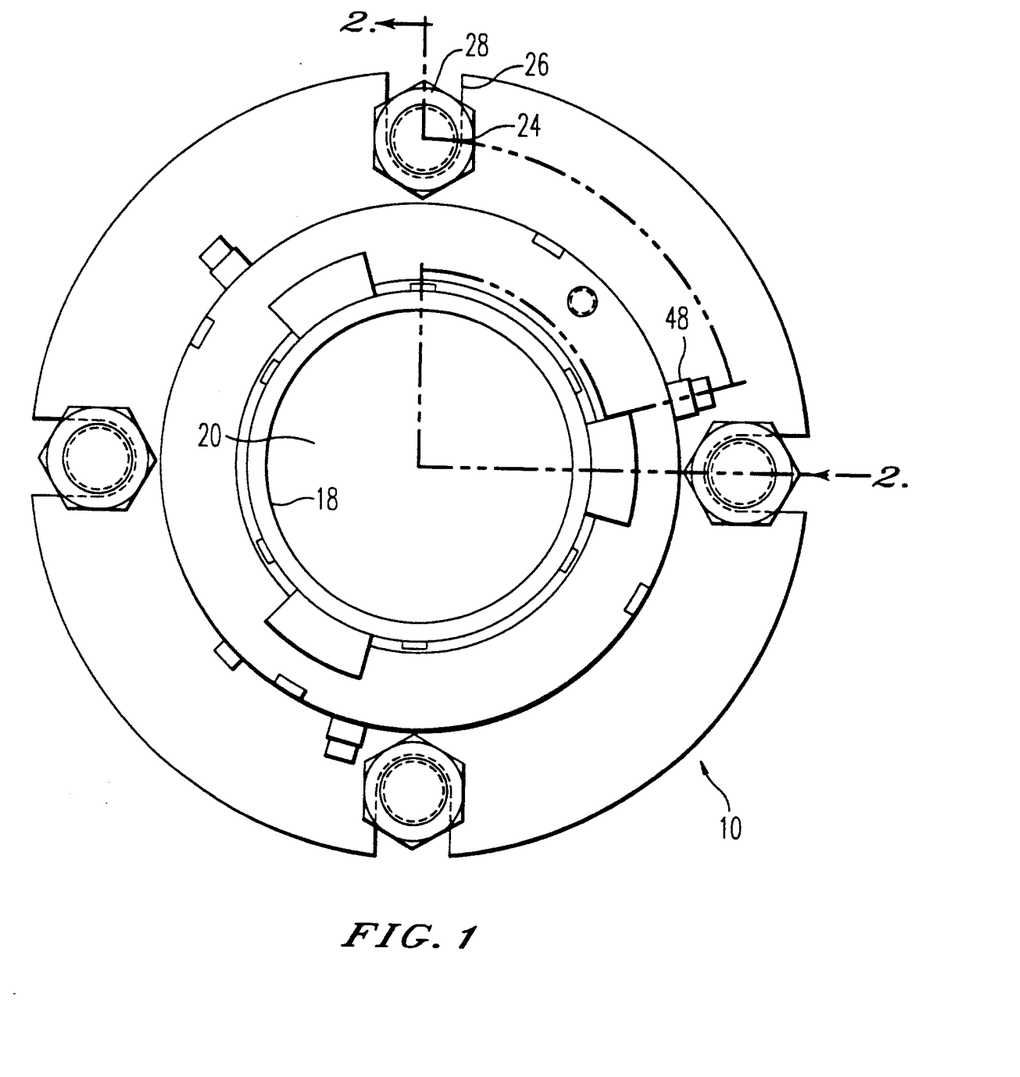
FIG. 1 is a frontal view of a preferred sealing device embodying the principles of the present invention.
Figure 2:
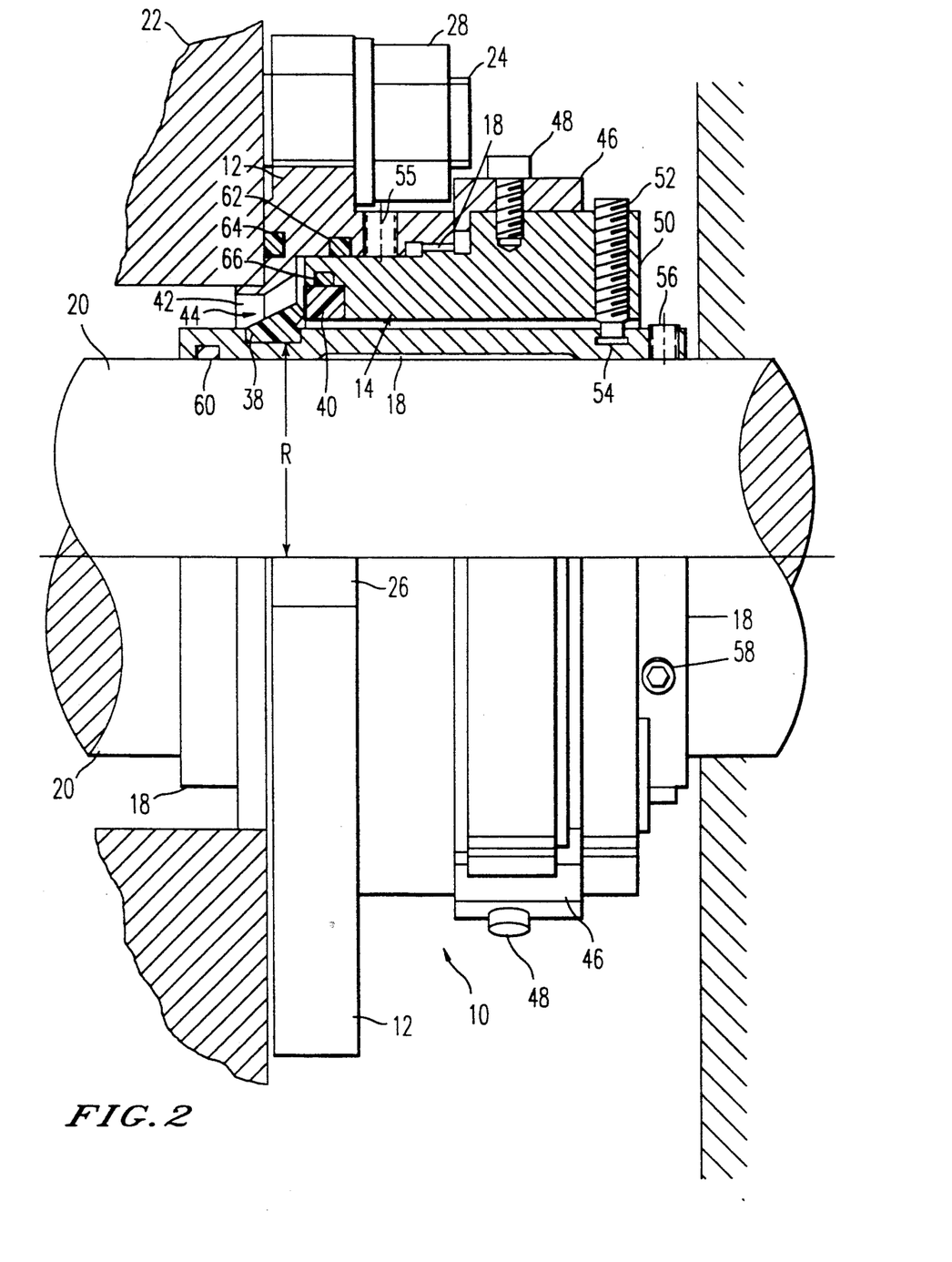
FIG. 2 is a view in elevation and in section taken along the line 2—2 in FIG. 1.

Referring to FIGS. 1 and 2 of the drawings, FIG. 1 is a frontal plane view of a dry face sealing device embodying the principles of the present invention, and FIG. 2 is a view in elevation and in section taken along the line 2—2 in FIG. 1.

In general, the dry face rotary dry face sealing device 10 comprises an annular plate-like collar 12 through which extends an axially adjustable dry rigid seal housing 14 in threaded engagement therewith through mutually engaging threads 16. Sleeve 18 is adapted to be rotatably mounted, fixed to a pump shaft 20 concentric therewith. The annular flange 12 is attached to a wall 22 in a pump housing, stuffing box or a similar structure by means of bolts 24 which may extend through holes or slots 26 in an area near the periphery of the housing, secured by nuts 28.

Sleeve 18 can be made of any material which provides the requisite physical properties and chemical resistance, has a high operating temperature rating and is easily machined to close tolerance. Examples of suitable materials having these properties are stainless steel, titanium or polytetrafluoroethylene (PTFE). Metals are preferred because of their superior thermal conductivity and ability to dissipate heat from the seal elements.

On the wet side of the seal, the dry face rotary resilient seal 38 abuts rigid stationary ring seal 40 mounted in housing 14 as described in greater detail hereinafter in conjunction with FIG. 3.

Pilot sleeve 42, integral with the flange plate 12, centers the plate in the wall 22 and defines circulating and cooling liquid channel 44 for circulation of liquid against and removing heat from the exposed surface of the rotary seal element 38.

Spacers 46, held in place by screws 48, hold the housing 14 rigidly in position during initial positioning of the seal assembly and sleeve on the shaft 20. Removal of the screw 48 and spacers 46 permits rotation of the housing 14 about the central axis to advance the housing 14 and stationary ring seal 40 mounted thereon against the rotary seal element 38 to establish a sealing engagement therebetween. The proximal portion of the gland follower has a dog screw channel 50 into which dog screw 52 is threadingly engaged during the initial mounting of the seal assembly on the shaft 20. The end of the dog screw 52 engages receptor 54 in the sleeve 18, preventing accidental rotation of the housing after removal of the spacers 46 and establishing an initial indexing position. After the dog screw 52 is removed, the housing are rotated about the axis of the shaft as a unit, the angle through which the housing is rotated determining the advancement of the housing along threads 16 and movement of the stationary ring seal 40 against the rotary seal 38. By rotating the housing about the central axis through a predetermined angle, a predetermined advancement of the stationary seal surface against the rotary seal is obtained as will be described in greater detail hereinafter.

Flange plate 12 has a threaded set screw channel 55 communicating with the outer surface of the housing 14. When the desired angular rotation of the housing about its axis is achieved, a set screw (not shown) is advanced in the channel 55 until it bears against the outer surface of the housing 12, preventing further rotation of the housing 12 about its axis and maintaining its adjusted position of the stationary ring seal 40 against the rotary seal 38.

The housing 12 in the preferred embodiment of this invention are selected from heat conductive metals such as aluminum, copper, and the like so they most efficiently conduct heat away from the stationary sealing ring 40 and the dry face stuffing box seal 30.

The proximal end of the sleeve 18 includes a sleeve channel 56 and setscrew 58. When the seal assembly is initially mounted on the shaft 20, the setscrew 58 is advanced tightly against the outer surface of the shaft 20, fixing the sleeve 18 to the shaft 20 so it rotates therewith as a single unit. The distal end of sleeve 18 includes an annular groove containing a sealing O-ring 60.

Mutually stationary surfaces include annular grooves containing O-ring seals 62, 64 and 66 to prevent liquid escape between elements of the seal assembly.

Figure 3:
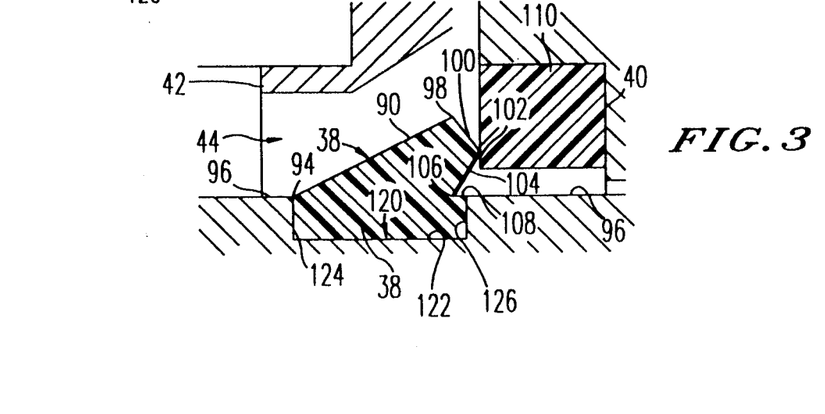
FIG. 3 an enlarged fragmentary, cross-sectional view of the primary dry face rotary seal according to this invention.

FIG. 3 is a fragmentary cross-sectional view of an embodiment of the rotary sealing element 38. In FIG. 3 the annular rotary seal 38 has a back surface 90 exposed to a pump chamber and liquid circulation channel 44. Surface 90 extends from pivot corner 94 contacting the sleeve surface 96 to the outer seal edge 98. The seal's forward surface comprises outer surface 100 sloping from the outer edge 98 to the forward projecting sealing edge 102. The rotary seal's forward surface of the rotary seal also includes an inner surface 104 which extends backward from the forward protruding sealing edge 102 to the torque corner 106 of the cylindrical surface 108. The cylindrical surface 108 is flush with the inner surface 96 of the sleeve.

In general, the dimensions of the seal should be increased as the inner diameter of the seal (in its relaxed state) is increased. The optimum dimensions are selected to accommodate the particular choice and properties of the resilient seal material, the pressure and operating temperatures in the pumping chamber, as will be readily apparent to a person skilled in the art.

The rotary seal 38 comprises an elastomeric polymer having the chemical and thermal resistance and the mechanical properties required for the environment to which it is exposed in use. The seal should have a breaking elongation of at least 100 percent and up to 150 percent. For most industrial applications for pumping slurries and aqueous suspensions, the breaking elongation should be from about 100 up to about 150 percent. The durometer hardness of the seal composition should be from about 85 to about 95 and preferably from about 90 up to about 95.

The composition of the elastomeric polymer component is selected to provide resistance to thermal degradation and an optimum service in the particular environment to which the seal will be exposed. One suitable elastomeric polymer is AFLAS (Asahi Glass Co, Inc.), a peroxide cured copolymer of tetrafluoroethylene and propylene. Other suitable elastomeric polymers include FKM-Tetrapolymer and base resistant FKM polymers (Macrotech/CDI, Humble, Tex.). The durometer hardness of the polymeric composition can be adjusted by intermixing the polymer with a requisite quantity of a finely divided carbon filler such as Austin Black.

A critical aspect of the elastomeric seal is the extent it is stretched in the direction parallel to the seal surface of the opposed stationary, rigid seal. The stretching should be sufficient to substantially reduce the coefficient of friction between the sealing surfaces. The stretching stress hardens the projecting edge of the resilient seal, aligns the polymeric components of the seal in a direction parallel to the seal surface and reduces irregularities in the sealing surface of the seal, thereby reducing the coefficient of friction between the sealing surfaces. The preferred extent of stretching is at least 20 percent up to less than 40 percent of the breaking elongation of the seal material. Referring to FIG. 3, the resilient seal is maintained in the desired stretched condition by the inner diameter dimension R (FIG. 2) of the seal seat 120. The resilient seal 38 is supported in annular seat 120 held in the desired degree of stretch by the cylindrical surface 122 and securely in place between opposed sidewalls 124 and 126. The radius R of the seat surface 122 and the relaxed inner diameter of the seal 38 are selected to maintain the seal in the selected degree of stretch. Stretching the annular seal in its circumferential direction produces a corresponding reduction in the width of the seal, including the width of the seal foot secured between surfaces 124 and 126. The distance between the opposed surfaces 124 and 126 should be selected to coincide with the width of the seal foot at the selected degree of stretch. The seal is positioned in this seat by stretching it, sliding it along the sleeve to its position in the seat 120 and relaxing the seal, permitting it to contract to fit securely in the seat 120.

Because the surface 100 and 104 converge to form the projecting edge 102, circumferential stretching of the resilient seal by increasing the seal diameter in the direction R concentrates stress hardening at the edge 102, greatly reducing the coefficient of friction between the sealing surfaces 102 and 110.

A seal is established by advancing the dry rigid seal housing 14 toward the sealing projection 102 of the resilient 38. It is critical that the housing 14 be advanced to press the projecting edge in an axial direction against the smooth sealing surface with a pressure which is sufficient to effect a seal therebetween under operating conditions of the seal but which will not produce sufficient heat of friction to cause significant chemical changes in the projecting edge of the resilient seal. This is a critical adjustment, for excessive pressure will produce excessive friction, heat and sealing surface destruction. The pressure selected, however, should be sufficient to maintain the sealing engagement continuously during operation of the machinery being sealed.

The heat of friction unavoidable produced at the sealing surface is dissipated by the liquid being processed and the material of construction of the rigid seal 40 and the rigid seal housing 14. It is thus critical that the equipment be started with liquid in the pumping chamber to dissipate the initial heat generated in the seal face.

The radial width of the sealing surface produced by compression of the annular projection 102 by the opposing surface 110 of the rigid seal is preferably the minimum radial with which is sufficient to maintain a seal. Excessive width and surface area of contact between the seals produces excessive heat, increasing the risk of seal destruction. The desirable sealing surface width for most applications should be less than 2 mm.

Figure 4:
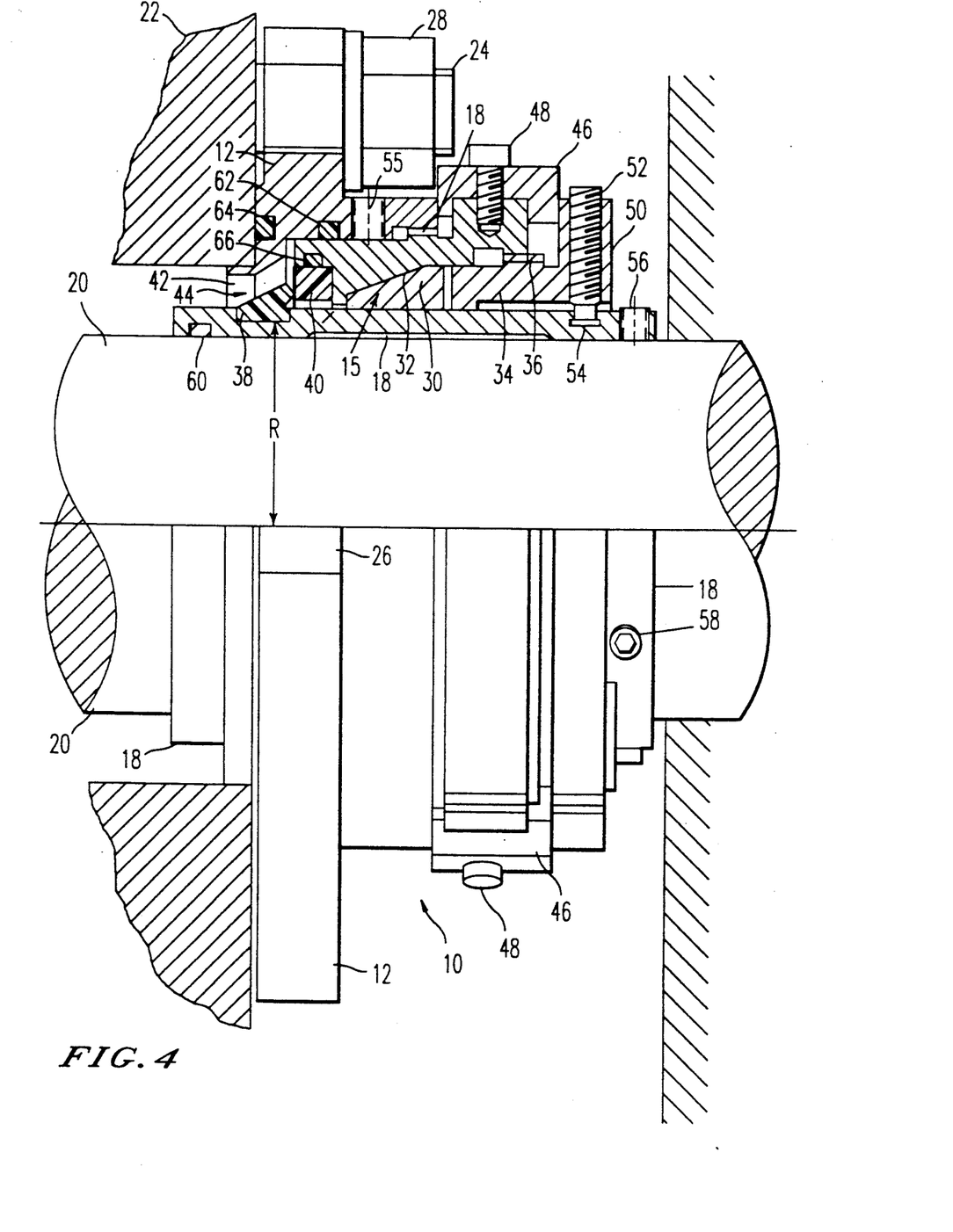
FIG. 4 is a view in elevation and in section of the primary seal shown in FIG. 2 adapted to be in combination with a stuffing box backup seal.

FIG. 4 is a view in elevation and in section of the primary seal shown in FIG. 2 adapted to be in combination with a stuffing box backup seal. The structure shown in FIG. 4 is essentially the same as the primary seal structure shown in FIG. 2 but with the axially adjustable dry rigid seal housing 14 replaced with a modified axially adjustable dry rigid seal housing 14 and combined with the stuffing box backup seal components. For explanations of the components common to and unchanged in both embodiments, reference should be made to the corresponding description provided with respect to FIGS. 2 and 3.

The dry face stuffing box rotary secondary or backup seal 30 is mounted in an annular frustoconical cavity 32 in housing 15 as described in greater detail hereinafter in conjunction with FIG. 5. Gland follower 34 is mounted around sleeve 18 in threaded engagement with the housing 15 through threads 36 for rotation and advancement against the seal 30.

Figure 5:
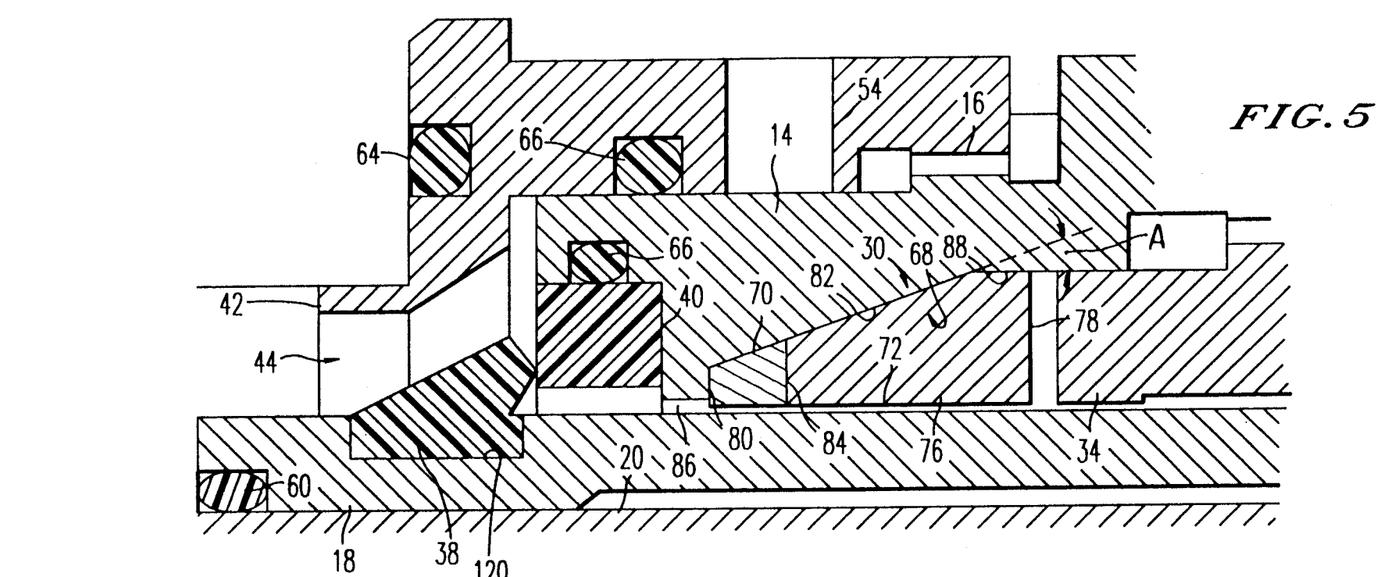
FIG. 5 is an enlarged fragmentary, cross-sectional view of the seals, and in particular the stuffing box gland seal according to this invention.

Referring to FIG. 5, the stuffing box is a frustoconical gland packing receptor 68 adapted to surround an rotary sealing surface 72 axially concentric therewith. The packing receptor has a distal end and a proximal end, the distal end having a packing abutment surface 80, and a sloped surface 82 extending radially outward from the abutment surface toward the proximal end. The packing comprises an annular, plastic sacrificial packing 70 positioned in the distal end, the sacrificial packing having a proximal surface 84. An annular, slightly deformable primary packing 76 is positioned between the proximal surface 84 of the sacrificial packing and the proximal end of the gland packing receptor. When the seal is unseated, the annular packing rings are spaced from a rotary sealing surface 72 axially concentric therewith. When the seal is seated, the sacrificial packing is compressed tightly against the gland surface and flows between the rotary surface 72 and the opposed surface 86. The primary packing is compressed tightly against the sacrificial packing and the gland surface. It is displaced forward toward surface 80 until the sacrificial and primary packing are forced into contact with the rotary sealing surface.

In its initial setting, the backup stuffing box seal 30 is spaced from the sleeve 18 and is not providing a seal function. The concentric, annular gland follower 34 has a compression surface opposed to the proximal surface 78 of the primary seal 76, the gland follower being axially concentric therewith. Upon failure of the primary seal 38, rotation of the gland follower 34 about its axis advances the gland follower against the proximal surface 78 of the primary packing 76, forcing the inner sealing surface into a sealing engagement with the exterior surface of the sleeve 18. Since the gland follower 34 is stationary, it can be advanced while the sleeve 18 and the sealing surface 72 are in rotary motion (FIG. 4).

Preferably, the sacrificial packing 70 is a preshaped frustoconical ring containing graphite and a thermally stable, thermoplastic fluorocarbon plastic and the primary packing is a preshaped, slightly deformable composition comprising graphite. The primary packing can be prepared by pressure molding conventional graphite foil (GRAFOIL®, EGC Enterprises Inc.) such as described in U.S. Pat. Nos. 4,102,960, 4,075,114 into the desired frustoconical shape and size. Optimally, the frustoconical gland surface forms an angle A of from 10° to 30° with a line parallel to the central axis of the gland. The gland seal can have a cylindrical surface 88 at the proximal end of the gland.

Figure 6:
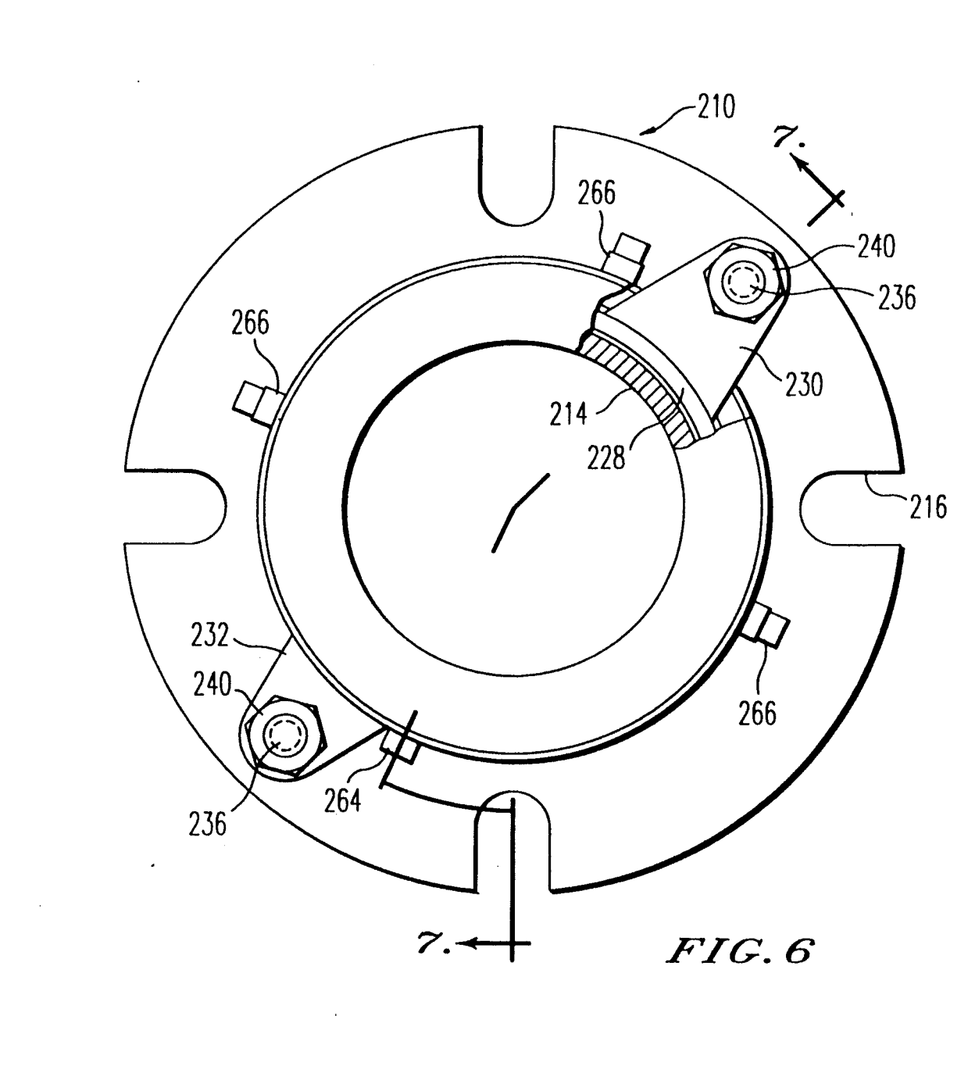
FIG. 6 is a frontal view of an alternative sealing device embodying the principles of the present invention, shown assembled and ready for installation, with a portion of a gland follower ring broken away to show the underlying structure.
Figure 7:
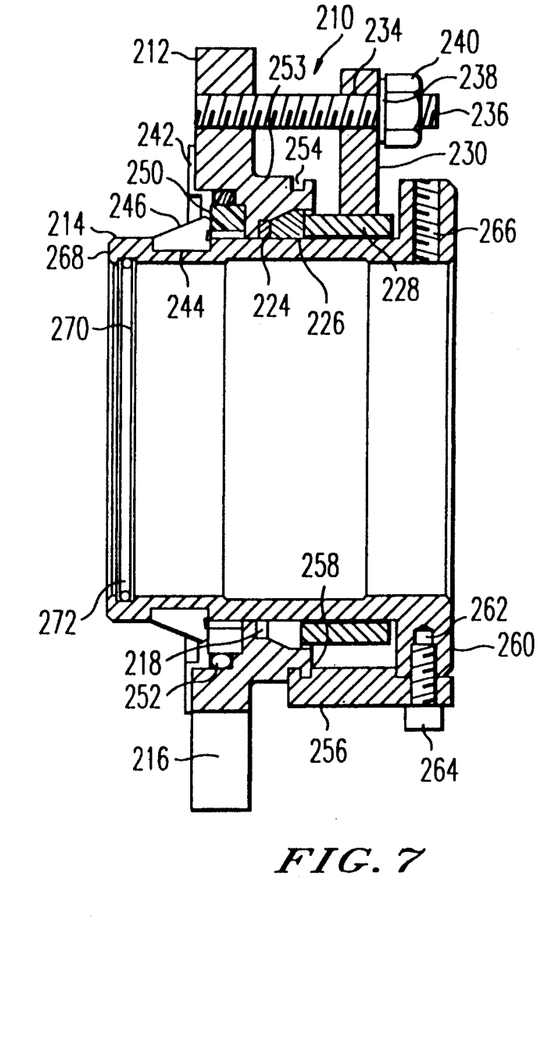
FIG. 7 is a view in elevation and in section taken along the line 7—7 in FIG. 6.

Referring to FIGS. 6 and 7 of the drawings, FIG. 6 is a frontal plane view of another embodiment of the dry face sealing device embodying the principles of the present invention, shown assembled and ready for installation. FIG. 7 is a view in elevation and in section taken along the line 7—7 in FIG. 6.

In general, the dry face rotary dry face sealing device 210 comprises an annular plate-like housing or gland 212 through which extends a sleeve 214 that is adapted to be mounted, fixed to a pump shaft (not shown) which is rotatable about it axis. The annular housing 212 is attached to a wall in a pump housing, stuffing box or a similar structure by means of bolts which may extend through holes or slots 216 in an area near the periphery of the housing.

Sleeve 214 can be made of any material which provides the requisite physical properties and chemical resistance, has a high operating temperature rating and is easily machined to close tolerance. An example of a suitable material having these properties is polytetrafluoroethylene (PTFE).

Figure 8:
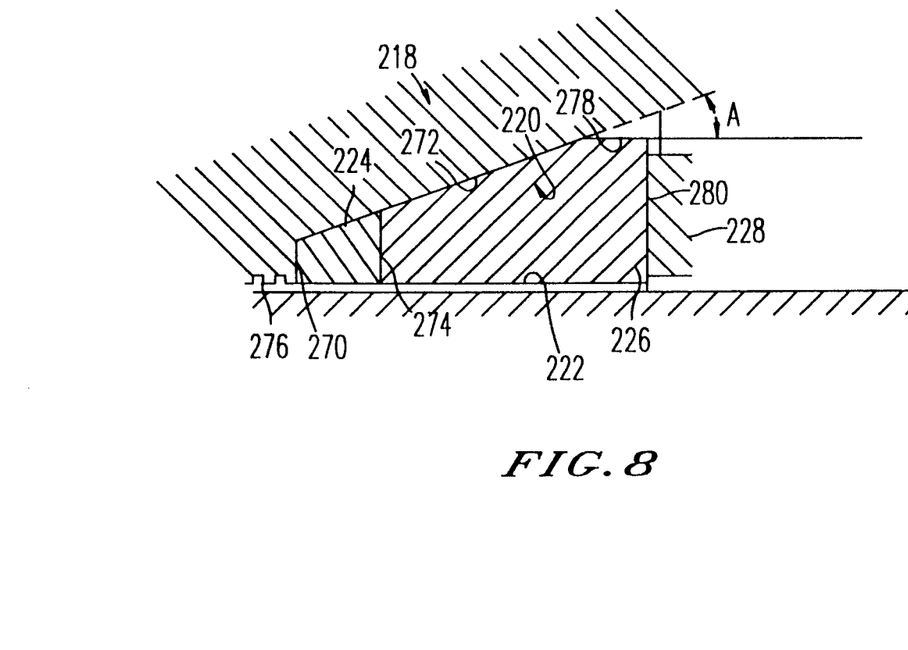
FIG. 8 is a fragmentary, expanded cross-sectional view of the stuffing box gland seal shown in FIG. 7.

The dry face stuffing box rotary seal 218 is shown in greater cross-sectioned detail in FIG. 8. It comprises a frustoconical gland packing receptor 220 surrounding rotary sealing surface 222 of the sleeve 214 concentric therewith. Sacrificial packing ring 224 and primary packing ring 226 are positioned in the receptor 220.

Gland follower ring 228 is positioned against a distal outer surface of the packing 226 to apply compressive pressure to the packing. The gland follower 228 is connected to wing elements 230 and 232 symmetrically positioned on opposite sides of the follower ring 228. These wings have a hole 234 through which a rod 236 extends, the rod 236 being secured to the housing 212. The end of the rod 236 is threaded and supports a conventional washer 238 and nut 240. Advancing the nut 240 toward the housing 212 in turn advances the follower ring 228 against the packing, causing the packing to seat as will be described in greater detail hereinafter. Since the housing 212 is stationary, the nut 240 can be advanced while the sleeve 214 and the sealing surface 222 are in rotary motion.

On the wet side of the pump, a gasket 242 is provided to seal the plate-like housing 212 against leakage. The sleeve 214 has a groove 244 which accommodates and retains an annular rotary seal member 246 having a base which seats in the groove 244.

The rotary seal has a proximal edge which abuts an annular stationary ring seal member or seat 250. This stationary ring seal 250 is mounted to the housing 212.

The stationary seal 250 has a rectangular cross-section. O-ring 252 is pressed against the outer surface of the stationary ring seal and adjacent housing surfaces, preventing passage of liquid between the ring seal 250 and the housing 212.

The stationary seal 250 is made of a corrosion resistant, hard, highly heat conductive material which will maintain a smooth surface in continued use. A preferred stationary seal material is silicon carbide.

An annular proximal end portion of the housing 212 has an outer sleeve 253. The sleeve flange 252 has a groove 254 for receiving one end of a series of clip spacers 256. The clip spacers 256 are preferably made of a hard relatively rigid plastic material such as nylon. As described hereinafter, the spacers 256 are used to maintain a pre-load on the rotary seal 246. They are located at four or six circumferentially spaced apart locations on the sealing device 210 as shown in FIG. 5. Each clip spacer 256, as shown in FIG. 6, has a transverse groove 258 for engaging the groove 254 of the sleeve 253. The spacers 256 are attached to and extend over a sleeve collar 260. A series of threaded holes 262 are provided at 90° spaced apart locations on the sleeve collar and each pre-load spacer clip 256 is retained thereto by a cap screw 264. Between the cap screws are a second series of threaded holes 266 which extend radially inwardly to the inner surface of the sleeve 214. Set screws (not shown) within the holes 266 are advanced after the sealing device 210 is installed to secure the sleeve to a pump shaft (not shown).

In the distal end 268 of the internal wall of sleeve 214, groove 270 is provided for retaining an O-ring 272. This O-ring provides a fluid seal between the sleeve 214 and a shaft when inserted therethrough. The groove 270 is spaced back from the inner end of the sleeve 214 by at least 0.10 in. so that the hydraulic force of the liquid within the casing in a typical installation will not spread the front edge 268 of the sleeve and allow leakage along the pump shaft.

During pump operation, the rotary seal 246 contacts and rotates relative to the stationary seal 250. The rotary seal 246 is an important element of the sealing device 210 because it provides for effective sealing between it and the stationary seal 250 for long periods of relative movement between these two elements.

To those skilled in the art to which this invention relates, many changes in construction and widely differing embodiments and applications of the invention will make themselves know without departing from the spirit and scope of the invention. The disclosure and the description herein are purely illustrative and are not intended to be in any sense limiting.

What is claimed is:

1. A method for preventing leakage around a rotary shaft extending through a structural casing by contacting a rigid smooth sealing surface with a projecting sealing edge of an annular resilient seal without liquid lubrication therebetween, the resilient seal having a breaking elongation of at least about 100 percent of its original length, the resilient seal being stretched from at least about 20 up to about 40 percent of its breaking elongation in a direction substantially parallel to the smooth sealing surface, whereby to reduce the coefficient of friction between the projecting sealing edge and the smooth sealing surface by stress hardening the projecting edge, aligning polymeric resilient seal components in a direction parallel with the smooth sealing surface, and smoothing the sealing surface thereof; and pressing the projecting edge in an axial direction against the smooth sealing surface with a pressure which is sufficient to effect a seal therebetween under operating conditions of the seal but which will not produce heat of friction sufficient to cause significant chemical changes in the projecting edge of the resilient seal.

2. A method of claim 1 wherein the width of the projecting edge in contact with the smooth sealing surface in the radial direction is less than about 2 mm.

3. A method of claim 1 wherein the resilient seal has a durometer hardness of from about 85 to about 95.

4. A method of claim 3 wherein the durometer hardness is from 90 to about 95.

5. A method of claim 1 including positioning a frustoconical gland packing receptor of the dry face backup seal around a rotary sealing surface axially concentric therewith, the packing receptor having a distal end and a proximal end, the distal end having a packing abutment surface, positioning an annular, plastic sacrificial packing in the distal end, the sacrificial packing having a proximal surface, and positioning an annular, slightly deformable primary packing positioned between the proximal surface of the sacrificial packing and the proximal end of the gland packing receptor.

6. A method of claim 5 wherein the backup dry face seal is seated by compressing the primary packing tightly against the sacrificial packing until the inner surface of the primary packing forms a seal with the rotary sealing surface.

7. A method of claim 6 wherein the sacrificial packing and the primary packing are annular packing rings are initially unseated and spaced from a rotary sealing surface which is axially concentric therewith.

8. A method of claim 6 wherein the sacrificial packing is a preshaped ring containing graphite and a thermally stable fluorocarbon plastic.

9. A method of claim 6 wherein the primary packing is a preshaped, slightly deformable composition comprising graphite and a plastic binder.

10. A dry face rotary seal for preventing leakage around a rotary shaft comprising an annular rigid seal having a smooth sealing surface and an annular resilient seal having an annular projecting edge means for contacting the smooth sealing surface under a biased pressure to form a dry face seal in conjunction therewith, one of the rigid seal and the resilient seal being adapted for attachment to a rotary shaft and the other of the rigid seal and the resilient seal being adapted to be secured to a structural casing surrounding the rotary shaft, the resilient seal having a breaking elongation of at least about 100 percent of its original length, the resilient seal being stretched at least about 20 percent up to about 40 percent of its breaking elongation in a direction substantially parallel to the smooth sealing surface whereby the coefficient of friction between the projecting edge and the smooth sealing surface is reduced.

11. A dry face rotary seal of claim 10 wherein the projecting edge is pressed in an axial direction against the smooth sealing surface with a pressure which is sufficient to effect a seal therebetween under operating conditions of the seal but which will not produce sufficient heat of friction to cause significant chemical changes in the projecting edge of the resilient seal.

12. A dry face rotary seal of claim 11 wherein the width of the projecting edge in contact with the smooth sealing surface in the radial direction is less than about 2 mm.

13. A dry face rotary seal of claim 10 wherein the resilient seal has a durometer hardness of from about 85 to about 95.

14. A dry face rotary seal of claim 13 wherein the durometer hardness is from about 90 to about 95.

15. A dry face rotary seal of claim 10 wherein the resilient seal comprises a thermally and chemically resistant fluorocarbon polymer.

16. A dry face rotary seal of claim 10 comprising seal pressure adjustment means for adjusting the pressure of the projecting edge against the smooth sealing surface during relative rotary motion of the resilient and rigid seal.

17. A dry face rotary seal of claim 16 wherein the seal pressure adjustment means comprises a collar and rigid seal housing concentric therewith, the rigid seal housing in supporting engagement with the rigid seal, the collar being adapted to be secured to the structural casing surrounding the rotary shaft and in threaded engagement with a the rigid seal housing.

18. A dry face rotary seal of claim 10 wherein the rigid seal is mounted in an rigid seal housing having high thermal conductivity to remove heat of friction from the rigid seal.

19. A combination of a dry rotary face seal and a dry stuffing box rotary seal for preventing leakage around a rotary shaft, the dry face rotary seal comprising an annular rigid seal having a smooth sealing surface means for establishing a dry face seal and an annular resilient seal having an annular projecting edge means for contacting the smooth sealing surface under a biased pressure to form a dry face seal in conjunction therewith, one of the rigid seal and the resilient seal being adapted for attachment to a rotary shaft and the other of the rigid seal and the resilient seal being adapted to be secured to a structural casing surrounding the rotary shaft, the resilient seal having a breaking elongation of at least about 100 percent of its original length, the resilient seal being stretched at least about 20 percent up to about 40 percent of its breaking elongation in a direction substantially parallel to the smooth sealing surface whereby the coefficient of friction between the projecting edge and the smooth sealing surface is reduced, and the dry stuffing box rotary seal comprising a gland packing receptor adapted to surround a rotary sealing surface axially concentric therewith, the packing receptor having a distal end and a proximal end, the distal end having a packing abutment surface, a sloped surface extending radially outward from the abutment surface toward the proximal end, an annular, plastic sacrificial packing positioned in the distal end, the sacrificial packing having a proximal surface, and an annular, slightly deformable primary packing positioned between the proximal surface of the sacrificial packing and the proximal end of the gland packing receptor.

20. A combination of claim 19 wherein the projecting edge is pressed in an axial direction against the smooth sealing surface with a pressure which is sufficient to effect a seal therebetween under operating conditions of the seal but which will not produce sufficient heat of friction to cause significant chemical changes in the projecting edge of the resilient seal.

* * * * *